United States Patent
Huitric

(10) Patent No.: US 7,736,520 B2
(45) Date of Patent: Jun. 15, 2010

(54) SEQUENTIAL CHLORINATION FOR CONTROL OF WASTEWATER DISINFECTION BYPRODUCTS

(75) Inventor: Shiaw-Jy Huitric, Whittier, CA (US)

(73) Assignee: County Sanitation Districts of Los Angeles County, Los Angeles, CA (US)

( * ) Notice: Subject to any disclaimer, the term of this patent is extended or adjusted under 35 U.S.C. 154(b) by 25 days.

(21) Appl. No.: 11/787,959

(22) Filed: Apr. 18, 2007

(65) Prior Publication Data

US 2008/0257832 A1     Oct. 23, 2008

(51) Int. Cl.
C02F 1/76       (2006.01)
C02F 1/00       (2006.01)

(52) U.S. Cl. .................. 210/739; 210/754; 210/755; 210/756; 210/752

(58) Field of Classification Search .................. 210/752, 210/753, 756, 758, 739, 754, 755
See application file for complete search history.

(56) References Cited

OTHER PUBLICATIONS

Gordon R. Finch, "Water Industry Challenge—Waterborne Parasites—Part II", Environmental Science & Engineering, Sep. 1996 (condensed online version), pp. 1-4.*
A.C. Twort, D.D. Ratnayaka and M.J. Brandt, "Disinfection of Water", Water Supply, © Jun. 2000, Elsevier, 5th Edition, pp. 429-463.*
Mark W. LeChevalier and Kwok-Keung Au, "Inactivation (disinfection) processes", Water Treatment and Pathogen Control: Process Efficiency in Achieving Safe Drinking Water, © 2004, World Health Orgainization, Chapter 3, pp. 41-65.*
J.L Rennecker, A.M. Driedger, S.A. Rubin and B.J. Marinas, "Synergy In Sequential Inactivation Of *Cryptosporidium parvum* With Ozone/Free Chlorine And Ozone/Monochloramine", Water Research, © 2000 Elsevier Science Ltd., vol. 34, No. 17 pp. 4121-4130.*
Chen C. and Zhang X J, "Reduction of disinfection by-products with short-term free chlorine plus chloramines disinfection process", Sep. 2004, Abstract of presentation at 4th IWA World Water Congress and Exhibition, Marrakech, Morocco.*
Mitch W A and Sedlak D L, "Characterization and Fate of N-Nitrosodimethylamine Precursors in Municipal Wastewater Treatment Plants", Environ. Sci. Technol., 2004, 38(5), 1445-1454. NOTE: The article on 1449 form dated May 23, 2008 has same title, but shows different and inconsistent bibliographic info. This citation here is correct.*
Mitch, et al; Characterization and Fate of N-Nitrosodimethylamine Precursors in Municipal Wastewater Treatment Plants; Environmental Science & Technology, 36, 588-595, (2002).

(Continued)

Primary Examiner—Duane Smith
Assistant Examiner—Paul J Durand
(74) Attorney, Agent, or Firm—Sanford Astor; Lewis Brisbois Bisgaard & Smith

(57) ABSTRACT

A process for the reduction of N-nitrodimethylamine (NDMA) and for control of trihalomethanes (THMs) and haloacetic acids (HAAs) formation in fully nitrified wastewater effluent, comprising first adding chlorine to the effluent, then adding combined chlorine.

13 Claims, 3 Drawing Sheets

OTHER PUBLICATIONS

Schreiber, et al; Influence of the Order of Reagent Addition on NDMA Formation during Chloramination; Envionmental Science & Technology, 39, 3811-3818, (2005).

Tang, et al; Disinformation alternatives to avoid NDMA formation; Wastewater Professional, 42, 14-23 (2006).

Chen, et al; Simultaneous Control of Microorganism, Disinfection By-Products and BioStability by Sequential Chlorination Disinfection; Environmental Science, vol. 27, No. 1, (2006) (Translation of Introduction attached).

* cited by examiner

SEQUENTIAL CHLORINATION FOR CONTROL OF WASTEWATER DISINFECTION BYPRODUCTS

FIELD OF THE INVENTION

This invention relates to the disinfection of wastewater, removing certain impurities, so that it can be used for certain purposes.

BACKGROUND OF THE INVENTION

Chlorination is the most widely used technology for wastewater disinfection. Chlorine can be added to treated effluent in several forms, most commonly as chlorine gas, sodium hypochlorite solution, or calcium hypochlorite tablets. For disinfection of effluent from conventional wastewater treatment processes that are not designed to remove nitrogen, chlorine reacts with ammonia nitrogen to form chloramines that are effective disinfectants. Inorganic chloramines consist mainly of monochloramine, and are referred to as "combined chlorine".

Over the past decade, removal of nitrogen from municipal wastewater has become an ever more common treatment objective. Consequently, an increasing number of conventional wastewater treatment systems have been upgraded to include biological nitrogen removal. Effluent from these plants is typically filly nitrified, i.e., it contains very low levels (<1 mg nitrogen per liter N/L)) of ammonia nitrogen. Free chlorine (hypochlorous acid and hypochlorite ion), instead of combined chlorine, becomes the main disinfectant at work if chlorine is used for disinfection of fully nitrified effluent. Free chlorine residual will be present if the chlorine dose exceeds approximately ten times the ammonia nitrogen concentration (on a weight basis) in the water. This process is referred to as the "breakpoint chlorination" process. Free chlorine species are strong oxidants and react at a much faster rate than combined chlorine. Free chlorine reacts with natural organic matters such as humic and fulvic substances in the effluent to form such disinfection byproducts (DBPs) as trihalomethanes (THMS) and haloacetic acids (HAAs). Because of their potential adverse effect on human health, the U.S. Environmental Protection Agency (USEPA) has set drinking water standards for total THMs (four chlorinated and brominated compounds) and HAA5 (five chlorinated and brominated haloacetic acids) at 80 µg/L (micrograms per liter, or parts per million) and 60 µg/L, respectively. Other DBPs that may be generated from the breakpoint chlorination process include cyanide and cyanogen chloride. Toxicity to aquatic life is another potential concern with breakpoint chlorination.

To minimize the formation of THMs and HAAs, some wastewater treatment plants that produce fully nitrified effluent continue to use chloramination for disinfection. This is accomplished by either adding pre-formed chloramines, or low levels of ammonia nitrogen followed by chlorine to form chloramines. However, it was recently found that chloramines are precursors to nitrosamines, a group of compounds considered to be extremely potent carcinogens. The most studied nitrosamine in wastewater treatment is N-nitrosodimethylamine (NDMA). The USEPA has established a 1 in 1,000,000 cancer risk at 0.7 ng/L (nanograms per liter, or parts per trillion) for NDMA, and the California Department of Health Services has set a drinking water Notification Level for NDMA at 10 ng/L. NDMA is formed when chloramines react with organic nitrogen-containing precursors such as dimethylamine (DMA). DMA is present in filly nitrified effluent, and is a key component in the cationic polymer commonly used to enhance floc settling during wastewater treatment. Dependent on the amount of precursors in water, significant levels (up to thousands ng/L) of NDMA may be formed from chloramination.

The Sanitation Districts of Los Angeles County (Districts), as well as many other such sanitation facilities, operate several water reclamation plants (WRPs) that produce fully nitrified effluent suitable for reuse applications. FIG. 1 depicts the typical treatment processes used to produce tertiary effluent at such WRPs. The processes include primary settling, aeration and secondary settling (the activated sludge process), media filtration, disinfection with chloramination, and dechlorination before discharge or reuse. The activated sludge process is designed and operated to biologically remove nitrogen so that the effluent is fully nitrified. In addition, Mannich type polymer is added before the secondary settling tanks to enhance floc settling.

While there may be multiple pathways to form NDMA, formation has not been determined. A study by Mitch and Sedlak suggested that formation of NDMA by reaction between monochloramine and organic nitrogen species, such as dimethylamine (DMA) via unsymmetrical dimethylhydrazine (UDMH) pathway could explain observed NDMA formation in full-scale treatment plants (Mitch and Sedlak, 2002). The proposed mechanism is described as:

$NH_2Cl+NH_2(CH_3)_2 \rightarrow (CH_3)_2NCl+NH_4^+$ (monochiloramine+DMA→chlorinated-DMA (CDMA)+$NH_4^+$)

$(CH_3)_2NCl+NH_3 \rightarrow NH_2N(CH_3)_2+HCl$ (CDMA+$NH_3$→UDMH+HCl)

$NH_2N(CH_3)_2+NH_2Cl \rightarrow (CH_3)_2N_2O$+others (UDMH+monochloramine→NDMA+others products)

Because of the use of chloramination for disinfection, NDMA formation has been observed in the Districts' WRPs. Although there is no federal or California drinking water standard for NDMA at present, the levels of NDMA formed during chloramination of wastewater are an important concern for the reuse of municipal wastewater. Therefore, it is desirable to prevent NDMA formation in the existing disinfection process.

One of the alternatives studied was breakpoint chlorination. Breakpoint chlorination was tested at two of the Districts' WRPs. Results from these studies indicated that breakpoint chlorination effectively inactivated total coliform and significantly reduced NDMA formation (Tang et al. 2006). However, breakpoint chlorination occasionally generated levels of total THMs higher than the drinking water standard. It was necessary to find another solution to the problem.

BRIEF DESCRIPTION OF THE INVENTION

The instant invention, which achieves the desired results, requires the use of free chlorine and chloramines, in a particular sequence, on fully nitrified secondary effluent. This new chlorination process complies with the California Title 22 disinfection requirements and minimizes formation of byproducts such as NDMA, THMs, and HAAs. This new chlorination process is named sequential chlorination and the general concept is depicted in FIG. 2.

DETAILED DESCRIPTION OF THE INVENTION

Figure 3:
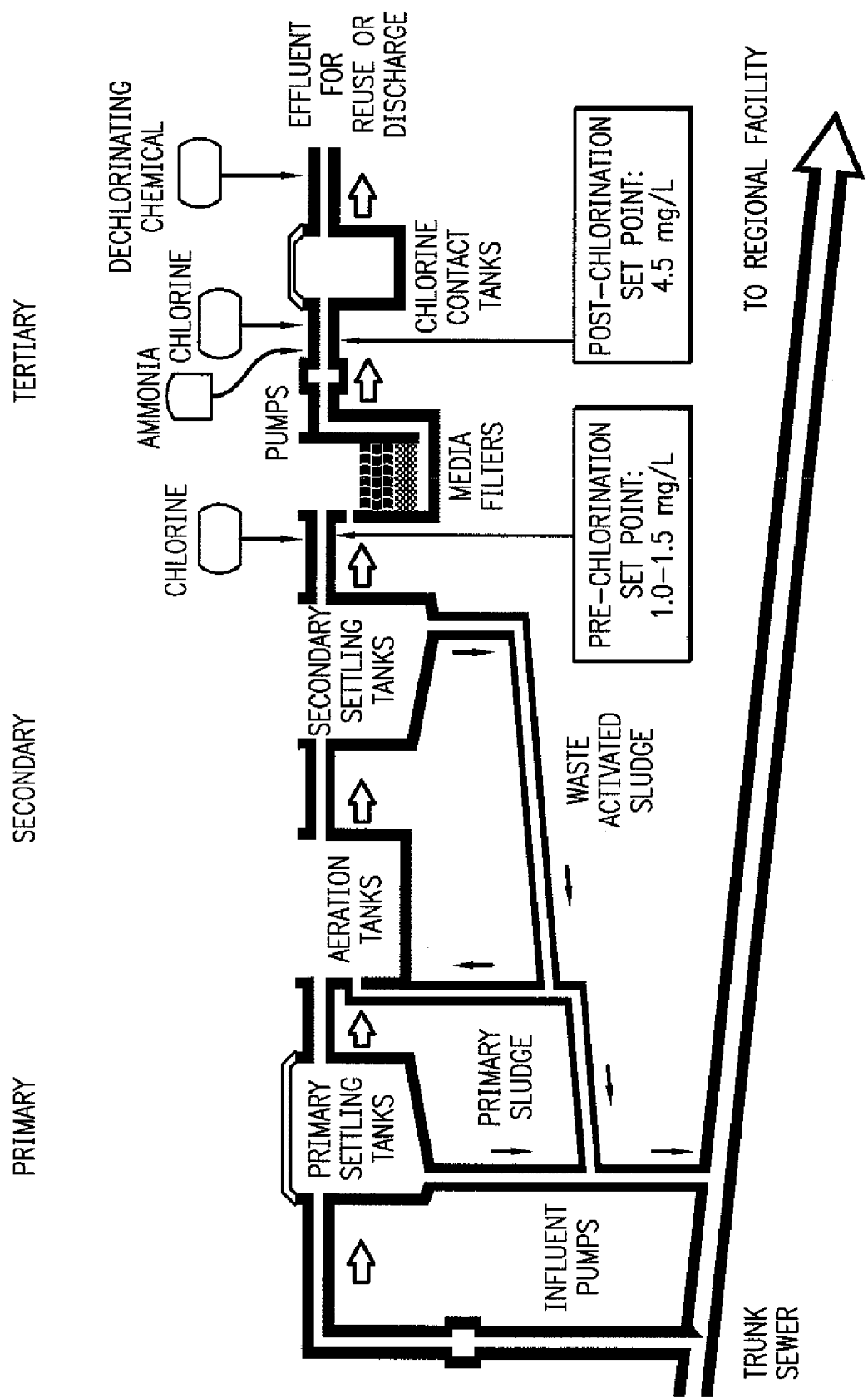

FIG. 3 depicts one configuration that can be utilized for sequential chlorination. It is used here to explain the unique process of sequential chlorination. In order to effectively apply sequential chlorination, effluent from the secondary settling tanks (secondary effluent) has to be fully nitrified, i.e., it must contain insignificant (typically below 1 mg N/L) levels of ammonia nitrogen. In the sequential chlorination process, chlorine addition is a two-step process. In the first step, chlorine is added to the fully nitrified secondary effluent. The chlorine dosage can be controlled by a target chlorine residual concentration (set point) or based on the flow rate of water to be treated.

The first step is to provide first tier disinfection and consumption of organic matters using free chlorine. In the second step, ammonia nitrogen (typically in the form of ammonium hydroxide) is first added to effluent from the media filters, followed immediately by additional chlorine dosing. Ammonia and chlorine doses in this step are dependent on facility-specific disinfection requirements. This process generates adequate chloramines (mostly in the form of monochloramine) for effective disinfection by adding chlorine and ammonia nitrogen in a specific sequence. This "sequential chlorination" process, not only achieves effective disinfection, as required by California Title 22 Water Recycling Criteria, but also reduces the formation of DBPs, specifically NDMA.

Although the configuration in FIG. 3 includes media filtration, the performance of sequential disinfection is not affected by the presence or absence of media filters, or other types of filters, as long as chlorine and ammonia are added according to the sequence described above. The first-step chlorine addition and ammonia addition should be sufficiently separated, by at least one minute, to achieve targeted disinfection at this stage. In the second step, time separation between ammonia addition and chlorine addition is not critical. To achieve effective disinfection, it is important that efficient mixing be implemented during chemical addition.

In the sequential chlorination process, chlorine added in the first step serves three functions:

(1) it inactivates bacteria and viruses upon addition to the water. This reaction occurs in a very short time because there is minimal ammonia nitrogen in the water (fully nitrified secondary effluent) and because chlorine is a strong oxidant;

(2) it reacts with precursors to NDMA formation, making them unavailable for NDMA formation, following ammonia and chlorine addition in the second step process; and (3) it helps control biological fouling of the filter media.

However, chlorine added in the first-step also reacts with DBP precursors and results in the formation of THMs and HAAs at this stage. Formation of THMs and HAAs is not an instantaneous reaction, but increases with time over a period of minutes or hours. In the second step, adding ammonia nitrogen helps to stop further formation of these DBPs in the chlorine contact tanks. Chlorine added following ammonia nitrogen addition results in the formation of chloramines that provide further bacteria and virus inactivation in the chlorine contact tanks. The presence of chloramines, however, may result in some NDMA formation if there are NDMA precursors remaining in the water.

Testing of Sequential Chlorination

Figure 1:
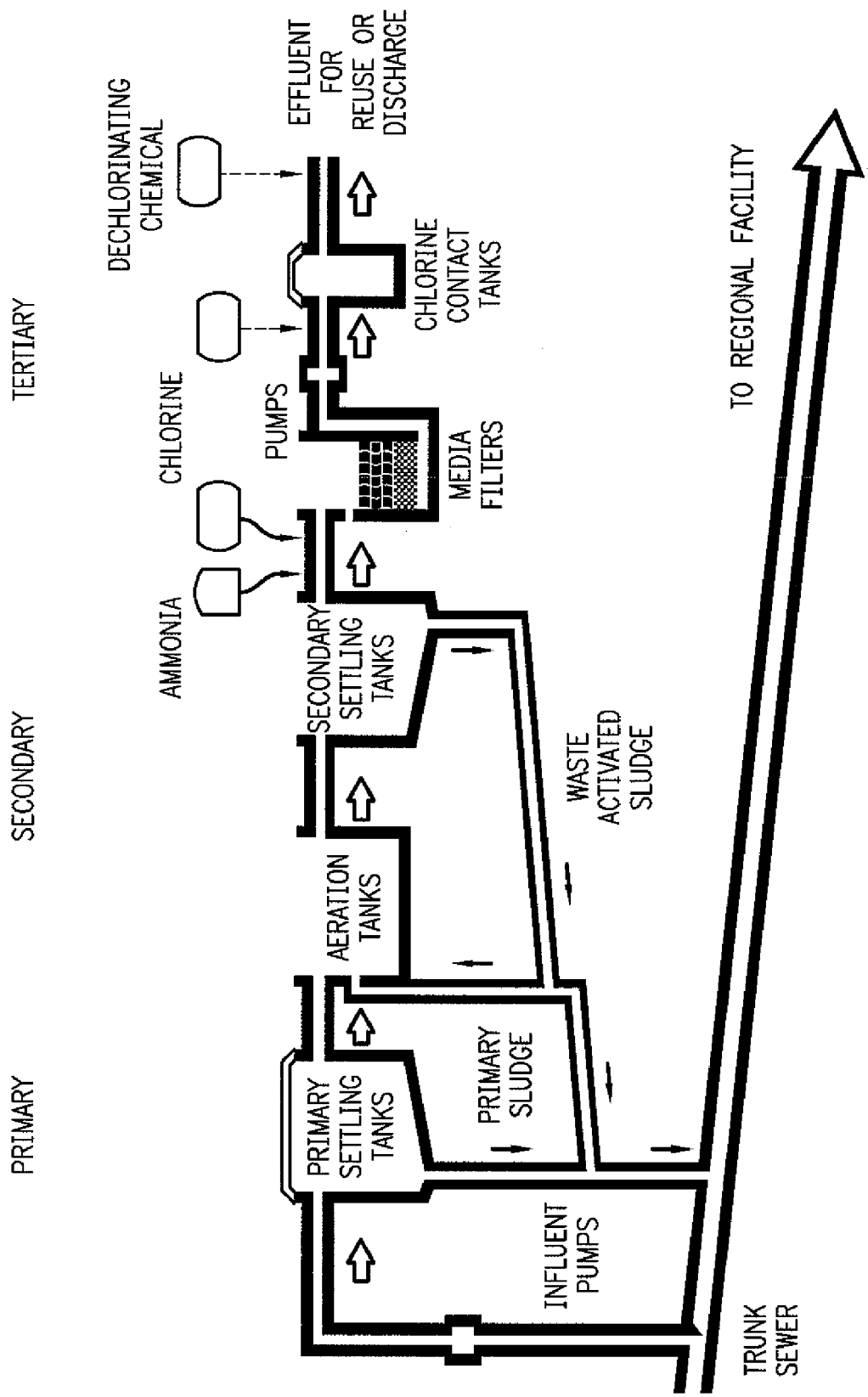
FIG. 1 is a flow diagram of typical treatment processes at the District's Water Reclamation Plant.
Figure 2:
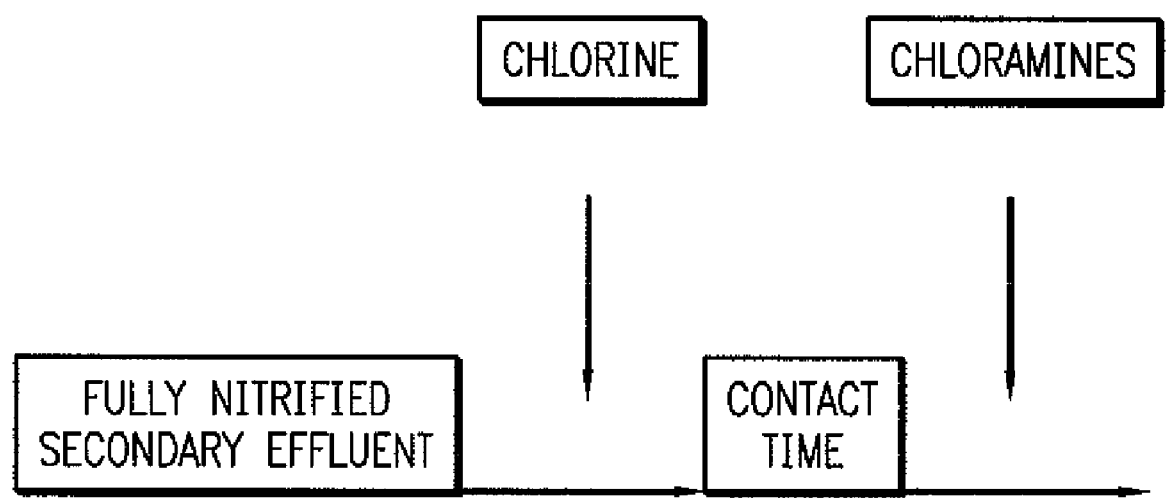
FIG. 2 is a flow diagram of the general concept of sequential chlorination; and, FIG. 3 is a schematic diagram of a fill scale test of sequential chlorination.

Sequential chlorination was tested on both bench scale and plant scale. Disinfection efficacy and DBP formation results are presented below and compared with baseline conditions (chloramination alone, FIG. 1).

Bench Scale Experiments

A total of seven bench scale experiments were conducted. The focus of the bench scale experiments was to evaluate the effect of sequential chlorination on DBP formation. The DBPs evaluated in these experiments included NDMA, THMs and cyanide. These experiments used fully nitrified secondary effluent samples from the Districts' WRPs. Results from the bench scale experiments are summarized in Table 1.

TABLE 1

Results of Bench Experiments: Chloramination vs. Sequential Chlorination

| Sample Description | NDMA (ng/L) | Total THMs (µg/L) | Cyanide (µg/L) |
|---|---|---|---|
| Secondary Effluent (Control) | 55-140 | — | <5 |
| Control + Chloramination only (Low Dose) | 300-1,300 | 3-5 | <5 |
| Control + Chloramination only (High Dose) | 790-5,400 | 7-17 | <5 |
| Control + Sequential Chlorination | 70-230 | 59-77 | <5 |

The laboratory results indicate the following:

1. The highest NDMA and lowest THM concentrations were observed when the samples were subject to only chloramination.
2. Sequential chlorination resulted in significantly reduced NDMA formation as compared to the levels observed with chloramination.
3. Sequential chlorination resulted in higher total THM levels in comparison to those under chloramination. However, these total THM levels were below the current drinking water standard for this parameter, 80 µg/L.
4. Neither chloramination nor sequential chlorination generated cyanide concentrations above 5 µg/L.

Full-Scale Test

Plant scale testing of sequential chlorination was conducted at four WRPs. The treatment capacity of these WRPs ranges from approximately 8 to 55 million gallons per day (MGD). The main objective in the full-scale testing was to determine effluent water quality characteristics including NDMA, THMs, cyanide, cyanogen chloride, biological toxicity, and total coliform levels using sequential chlorination.

The full-scale sequential chlorination testing was conducted according to the diagram and conditions shown in FIG. 3. In the first step, chlorine was added to the fully nitrified secondary effluent before it entered the media filters. The chlorine dosage was controlled by a target chlorine residual concentration, named "pre-chlorination set point." In the second step, ammonia nitrogen (in the form of ammonium hydroxide) was first added to effluent from the media filters, followed immediately by additional chlorine dosing. Chlorine dosing in this step was controlled by another chlorine residual set point, named "post-chlorination set point." During full-scale studies conducted at several WRPs, the pre-chlorination set point was between 1.0 and 1.5 mg/L, and the post-chlorination set point was approximately 4.5 mg/L. These set points were selected primarily based on the current disinfection requirements specified in California Title 22 regulations and represented combined chlorine residual concentrations. As mentioned previously, chlorine and ammonia doses may be facility-specific. The uniqueness of the sequential chlorination is the sequence of chemical addition.

To monitor disinfection performance and DBP formation during the full-scale testing, a water quality sampling and analysis program was implemented at each WRP for a minimum of four (4) weeks. Water quality samples were collected on a daily basis (Monday to Friday) for analyses of relevant water quality parameters. Results from all four WRPs are summarized in Table 2. Baseline data from chloramination are also summarized in Table 2 for comparison.

TABLE 2

Results of Full-Scale Testing: Sequential Chlorination vs. Chloramination

| Parameter Analyzed | Sequential Chlorination | Chloramination Only |
|---|---|---|
| Coliform (Colony/100 ml) | ≦2.2 | ≦2.2 (7-day average) |
| NDMA (ng/L) | 440 (median*) | 2050 (median*) |
| Total THMs (ug/L) | 33 (median*) | 15 (median*) |
| Cyanide (ug/L) | ≦5 | ≦5 |
| Cyanogen Chloride (ug/L) | <10 | No historic data |
| Toxicity | None | None |

*Highest median values from 4 plants tested.

Results from the full-scale testing indicate:
1. Sequential chlorination was effective in meeting California Title 22 requirements for total coliform inactivation.
2. Sequential chlorination significantly reduced NDMA formation from the levels observed under chloramination. Under chloramination, median NDMA concentration in the disinfected effluent was in excess of 2,000 ng/L. Sequential chlorination reduced this level by over 75% to <500 ng/L.
3. Sequential chlorination resulted in higher total THM levels than chloramination. The median total THM concentration for all samples analyzed during the sequential chlorination testing was less than 35 µg/L. Although higher than the median total THM level (15 µg/L) under chloramination, these levels are well within the current drinking water standard of 80 µg/L. HAAs were not analyzed during the full-scale testing. However, based on past experience, HAA5 concentrations are typically correlated to the total THM concentrations for effluent generated from the Districts' WRPs. The total THM results suggest that higher levels of HAA5 would be produced from sequential chlorination than from chloramination, but these levels would be well within the drinking water standard for this parameter, 60 µg/L.
4. Sequential chlorination had a very slight chance of generating cyanide at levels above the reporting limit (5 µg/L). During the full-scale test, the percent of samples with cyanide detection above the reporting limit was less than 2% (2 out of 159 samples). These detections may be considered statistical outliers.
5. Sequential chlorination did not generate cyanogen chloride at levels above 10 ug/L. Cyanogen chloride is not currently regulated, there is no baseline information regarding possible cyanogen chloride generation from chloramination.
6. Sequential chlorination did not result in statistically significant effect on aquatic toxicity.

Benefit of Sequential Chlorination

Both the bench and full-scale testing results of sequential chlorination show that it is an improved alternative to the common practice of chloramination for disinfection of fully nitrified effluent. The results show the following benefits of sequential chlorination:
1. Sequential chlorination provides effective disinfection as evidenced by total coliform concentrations in the effluent that consistently meet the standard specified in California Title 22 Water Recycling Criteria for disinfected tertiary recycled water.
2. Sequential chlorination significantly reduces NDMA formation in the effluent in comparison to chloramination.
3. Sequential chlorination can be operated such that the effluent consistently complies with the drinking water standard for total THM and HAA5.
4. Sequential chlorination does not result in significant generation of cyanide or cyanogen chloride in the effluent.
5. Sequential chlorination effluent does not cause toxicity to aquatic life.
6. Sequential chlorination may provide potential savings in chemicals used for disinfection and dechlorination.

Having thus described the invention, I claim:

1. A process for the reduction of N-nitrosodimethylamine (NDMA) and for control of trihalomethanes (THMs) and haloacetic acids (HAAs) formation in fully nitrified wastewater effluent comprising first adding chlorine to the effluent, then adding combined chlorine.

2. The process of claim 1 in which the chlorine is in the form of chlorine gas, sodium hypochlorite, or calcium hypochlorite.

3. The process of claim 1 in which the combined chlorine is chloramines.

4. The process of claim 1 in which the combined chlorine is formed by using ammonia and chlorine.

5. The process of claim 4 in which the ammonia is in the form of an ammonium containing compound.

6. The process of claim 1 in which the amount of chlorine and combined chlorine is controlled by two target chlorine residual concentrations.

7. The process of claim 1 in which the amount of chlorine and combined chlorine is based on flow rate of the water to be treated.

8. The process of claim 1 in which the addition of chlorine and combined chlorine is separated by at least one minute.

9. A process for the reduction of N-nitrosodimethylamine (NDMA) and for control of trihalomethanes (THMs) and haloacetic acids (HAAs) formation in fully nitrified wastewater effluent comprising treating the effluent with chlorine, waiting at least one minute and then adding ammonia followed by additional chlorine to the effluent to form chloramines.

10. The process of claim 9 in which the chlorine is in the form of chlorine gas, sodium hypochlorite, or calcium hypochlorite.

11. The process of claim 9 in which the ammonia is in the form of an ammonium containing compound.

12. The process of claim 9 in which the amount of chlorine and chloramines is controlled by two target chlorine residual concentrations.

13. The process of claim 9 in which the amount of chlorine and chloramines is based on the flow rate of the water to be treated.

* * * * *